United States Patent
Draperi et al.

(10) Patent No.: US 11,537,581 B2
(45) Date of Patent: Dec. 27, 2022

(54) CO-PARENT KEYS FOR DOCUMENT INFORMATION TREES

(71) Applicant: HEWLETT PACKARD ENTERPRISE DEVELOPMENT LP, Houston, TX (US)

(72) Inventors: Francois Draperi, Grenolble (FR); Herve Pellan, Grenoble (FR)

(73) Assignee: Hewlett Packard Enterprise Development LP, Spring, TX (US)

( * ) Notice: Subject to any disclaimer, the term of this patent is extended or adjusted under 35 U.S.C. 154(b) by 765 days.

(21) Appl. No.: 16/361,443

(22) Filed: Mar. 22, 2019

(65) Prior Publication Data
US 2020/0301900 A1    Sep. 24, 2020

(51) Int. Cl.
*G06F 16/00* (2019.01)
*G06F 16/22* (2019.01)
(Continued)

(52) U.S. Cl.
CPC ........ *G06F 16/2246* (2019.01); *G06F 9/5077* (2013.01); *G06F 16/2255* (2019.01);
(Continued)

(58) Field of Classification Search
CPC .... G06F 16/2246; G06F 16/313; G06F 16/93; G06F 16/2219; G06F 16/2255;
(Continued)

(56) References Cited

U.S. PATENT DOCUMENTS

| 5,202,986 A | 4/1993 | Nickel |
| 6,538,673 B1 * | 3/2003 | Maslov ................. G06F 40/143 |
| | | 715/764 |

(Continued)

FOREIGN PATENT DOCUMENTS

| EP | 1435581 B1 * | 4/2013 |
| WO | WO 03107174 A1 * | 12/2003 |

(Continued)

OTHER PUBLICATIONS

Emil Hadzhikolev et al.,"Digital Model of a Document in a University Document Repository", 20th International Symposium on Electrical Apparatus and Technologies (SIELA), Jun. 2018, pp. 1-4.*

(Continued)

*Primary Examiner* — Srirama Channavajjala
(74) *Attorney, Agent, or Firm* — Hewlett Packard Enterprise Patent Department

(57) ABSTRACT

Example implementations relate to generating a virtual co-parent key for a document information tree (DIT) including a plurality of child indexes each associated with a parent index. A virtual co-parent key for a first child index is generated. The first child index may be mapped to a child entry and may have a unique identification key including a child key and associated parent key. Generation of the co-parent key may include the computation of a co-parent seed key from the parent key or child key of the child index. Generation of the co-parent key may further include pre-pending the unique identification key with the computed co-parent seed key.

19 Claims, 7 Drawing Sheets

(51) Int. Cl.
*G06F 9/50* (2006.01)
*G06F 16/2458* (2019.01)
*G06F 16/958* (2019.01)
*G06F 16/951* (2019.01)

(52) U.S. Cl.
CPC ........ *G06F 16/2462* (2019.01); *G06F 16/951* (2019.01); *G06F 16/972* (2019.01)

(58) Field of Classification Search
CPC ...... G06F 16/81; G06F 16/2462; G06F 16/22; G06F 9/5077; G06F 3/067; G06F 3/0638; G06F 40/106; G06F 40/35; G06F 40/143; G06F 16/382; G06F 16/951; G06F 16/252; G06F 16/334; G06F 16/972; H04L 9/0643; H04L 9/0869
See application file for complete search history.

(56) References Cited

U.S. PATENT DOCUMENTS

| | | | |
|---|---|---|---|
| 7,237,192 B1* | 6/2007 | Stephenson | G06F 40/106 715/210 |
| 7,702,614 B1* | 4/2010 | Shah | G06F 16/3341 707/739 |
| 7,756,889 B2 | 7/2010 | Yu et al. | |
| 7,836,028 B1 | 11/2010 | Agarwal et al. | |
| 8,682,901 B1* | 3/2014 | Cao | G06F 16/93 707/741 |
| 9,740,724 B2 | 8/2017 | An et al. | |
| 10,235,338 B2* | 3/2019 | Laine | H04N 19/174 |
| 11,182,412 B2* | 11/2021 | Galitsky | G06F 40/35 |
| 2004/0073541 A1* | 4/2004 | Lindblad | G06F 16/81 |
| 2004/0117363 A1 | 6/2004 | Ohno | |
| 2006/0002550 A1* | 1/2006 | Campagna | H04L 9/0643 380/46 |
| 2007/0220033 A1* | 9/2007 | Sanders | G06F 16/81 707/999.102 |
| 2008/0222552 A1* | 9/2008 | Batarseh | G06T 11/60 715/776 |
| 2008/0243761 A1* | 10/2008 | Guo | G06F 16/2462 |
| 2012/0198241 A1* | 8/2012 | O'Hare | G06F 21/32 713/189 |
| 2017/0329801 A1* | 11/2017 | Rohlf | G06T 17/05 |
| 2020/0104284 A1* | 4/2020 | Draperi | G06F 16/22 |
| 2020/0177380 A1* | 6/2020 | Prince | H04L 9/0869 |

FOREIGN PATENT DOCUMENTS

| | | |
|---|---|---|
| WO | WO2011035389 A1 * | 3/2011 |
| WO | WO 2012102718 A1 * | 8/2012 |
| WO | WO2012170709 A2 * | 12/2012 |
| WO | WO2014093248 A2 * | 6/2014 |

OTHER PUBLICATIONS

S. Marinai et al.,"Tree clustering for layout-based document image retrieval", Second International Conference on Document Image Analysis for Libraries (DIAL'06), Apr. 2006, pp. 1-9.*
U.S. Appl. No. 16/225,327, filed Dec. 19, 2018, Draperi et al.
Oracle Corporation, "Partitioned Tables and Indexes," Chapter 11, 1999, https://docs.oracle.com/cd/A81042_01/DOC/server.816/a76965/c09parti.htm.

* cited by examiner

CO-PARENT KEYS FOR DOCUMENT INFORMATION TREES

BACKGROUND

Databases can be used to store large amounts of data. In many usage scenarios, data is read more often than is written, such that databases are optimized to improve read access time over write access time. However, in some usage scenarios, data may be written more often than may be read. Examples of such usage scenarios include telecommunication infrastructures, including cellular phone and mobile data telecommunication infrastructures, which employ lightweight directory access protocol (LDAP) document information trees (DITs) to store data.

BRIEF DESCRIPTION OF THE DRAWINGS

Certain examples are described in the following detailed description and in reference to the drawings, in which.

DETAILED DESCRIPTION OF SPECIFIC EXAMPLES

Databases may store a very large number of data entries, often reaching as much as billions of entries. Furthermore, many applications may share a database, thus increasing the number of data entries stored within a given database.

Data organized in an effective system within a database may result in faster and more efficient data lookups within a database. Generally, data is organized more effectively where the data is organized in a balanced manner. "Hot spots," areas of data storage with relatively high activity, generally result in longer I/O request wait times. By organizing data within a database in a more balanced manner, these data "hot spots" may be reduced.

Data written to a database may be identified by a distinguished name (DN), referred to herein as a key, which is a unique string that identifies an entry (i.e. the real data) within a database. An example database may be a lightweight directory access protocol (LDAP) database which may utilize an LDAP document information tree (DIT).

A DIT is a hierarchical structure. The hierarchical structure may include parent keys, keys to identify a particular parent data entry, and child keys, keys to identify a particular child data entry. In some examples, data entries of a database may be split across multiple partitions, which may be a physical split of the data, e.g. data split across different disks, volumes, etc., or may be a virtual split of the data.

For example, a child index within a DIT may be an index that stores a parent-child relationship. The key of a child entry may, for instance, include the key of the parent entry with which the child entry is associated, and may include an additional unique identifier to identify the particular child entry. By organizing keys in this fashion, a child entry may be retrieved through a lookup of the parent key associated with the child key of the child entry, and a search of each child key of the parent key. Hot spots within the database may occur where a particular parent entry has many, e.g. millions, of associated child entries, because each of the child keys starts with the same leading parent key.

Figure 1:
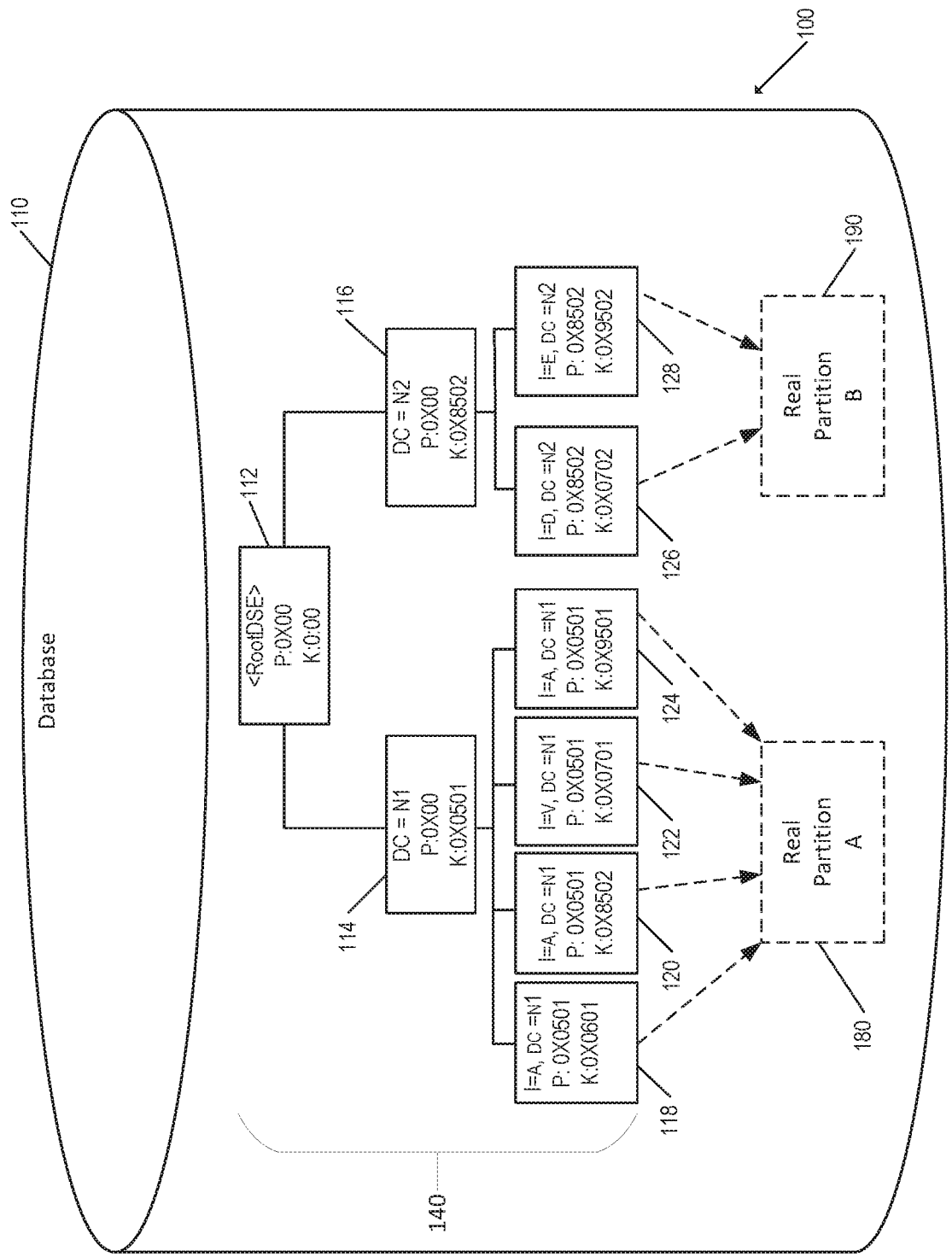
FIG. 1 is a block diagram illustrating a Document Information Tree (DIT) organized according to parent-child relationships.

FIG. 1 is a block diagram 100 illustrating a DIT 140 organized according to parent-child relationships. The DIT 140 may be stored at a database 110, e.g. an Indexed Sequential Access Method (ISAM) database. While a single database is shown for purposes of explanation and clarity, any number of databases may store the DIT, and the entries of the DIT may be spread across multiple databases.

In the case of an LDAP server, DIT 140 may include root Data source adaptor Specific Entry (DSE) 112. DSE 112 may include a null distinguished name including a zeroed out key, and may include information about the server capabilities and data included therewith.

DIT 140 may also include a first parent index 114 and a second parent index 116. In an example, first parent index 114 may be stored at a first partition A 180, and second parent index 116 may be stored at a second real partition B 190. Parent indexes 114 and 116 may each have corresponding parent keys. In this illustrated example, parent index 114 includes example key 0501 and parent index 116 includes example key 8502. In this example, parent index 114 and parent index 116 are children of root DSE 112. While two such parent indexes are shown, any number of parent indexes may be included in DIT 140.

Parent index 114 may have corresponding child indexes 118-124, and parent index 116 may have corresponding child indexes 126-128. Each child index may include a key. In this example, child index 118 includes example key 0601, child index 120 includes example key 8502, child index 122 includes example key 0701, and child index 124 includes example key 9501. Child indexes 118-124 additionally each include parent key 0501, and locate child entries stored within real partition A 180. Similarly, child index 126 includes example key 0702 and child index 128 includes example key 9502. Both child index 126 and child index 128 further include parent key 8502, and as illustrated, both child index 126 and child index 128 locate child entries stored within real partition B Each parent index and child index alike may further include a Relative Distinguished Name (RDN). While a distinguished name (DN) is a fully qualified path of names that traces an entry back to the DSE, a RDN may be a component of the DN. In other words, the RDN may describe a partial path to the entry relative to another entry. In this example, parent index 114 may include a RDN of DC=N1 and parent index 116 may include a RDN of DC=N2. Similarly, in this example each child index 118-124 may include an RDN of DC=N1 and each child index 126-128 may include a RDN of DC=N2.

Child entries may be mapped to particular parent entries for any number of reasons, depending on the DIT organizational structure. For instance, children of a particular parent entry may share a common geographic indicator, or may include data of a particular region, organization, etc. Depending on the organizational structure, imbalance between partitions may occur. For example, parent index 114 is associated with real partition A 180, and includes four child indexes 118-124, while parent index 116 is associated with real partition B 190, and includes two child indexes 126-128. Thus, partitions A and B can be said to be imbalanced, because A includes a greater number of entries than B. While an imbalance of a few entries may not be significant, some DIT organized in this fashion may result in millions, or even billions of imbalanced entries.

Figure 2:
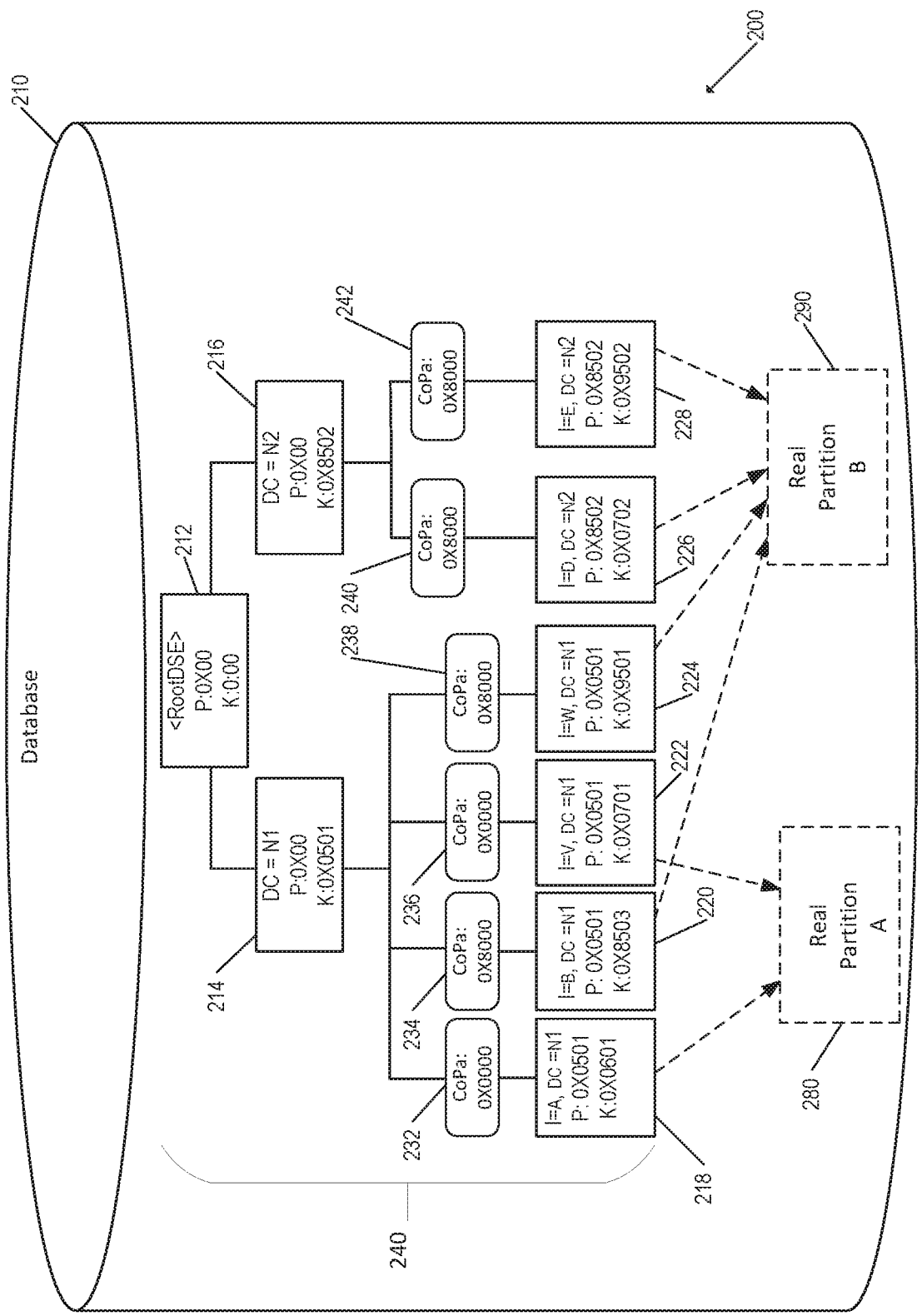
FIG. 2 is a block diagram illustrating an example database storing a DIT balanced by co-parent keys.

To maintain a DIT having balanced keys, i.e. parent keys of a DIT each associated with a relatively equal number of child keys, co-parent keys may be generated, in which the real key of the parent may be substituted with a computed virtual co-parent key. FIG. 2 is a block diagram 200 illustrating an example database 210 balanced by co-parent keys within a DIT 240. Like DIT 140 of FIG. 1, DIT 240 may include a root Data source adaptor Specific Entry (DSE) 212, including a null distinguished name having a zeroed out key, and information about the server capabilities and data included therewith. DIT may also include a first parent index 214 referencing a parent entry stored within a real partition A, and a second parent index 216 stored within a real partition B.

In this example, parent index 214 may be stored at a first real partition A 280 and any child entry of parent key 214 may likewise be stored at parent index 214, in this instance child keys 218-224. Similarly, parent index 216 may be stored at a second real partition B 290 and any child entry of parent key 216 may likewise be stored at parent index 216, in this instance child keys 226-228. In an example, entries associated with indexes of a like real partition may be stored at a like location, e.g. a like datacenter, geographic region, etc.

For a more balanced DIT, virtual co-parent keys may be generated and associated with child indexes. Take for instance, an example DIT in which any index associated with any keys within the range of 0X0000 to 0X7FFF are associated with a first virtual partition while any index associated with any keys within the range of 0X8000 to 0XFFFF are associated with a second virtual partition. In this instance, first parent index 214 may have a key of 0X0501 and may have four corresponding children indexes 218-224 respectfully. Each child key 218-224 may include parent key 0X0501 and a corresponding child key. Similarly, second parent index 216 may have a key of 0X8502 and may have two corresponding children indexes 226-228 respectfully. Each child key 226-228 may include parent key 0X8502 and a corresponding child key.

Each child index may be associated with a co-parent key. In this example, child indexes 218 and 222 are associated with co-parent key 0X0000 and child indexes 220, 224, 226, and 228 are associated with co-parent key 0X8000. The co-parent key may be prepended to the key of the child index to which it is associated, such that child indexes 218 and 222 are associated with the first virtual partition and child indexes 220, 224, 226, and 228 are associated with the second virtual partition. While two such virtual partitions are illustrated in this example, any number of virtual partitions may be implemented to partition any number of child indexes. In an example implementation, the number of virtual partitions may be a multiple of the real number of partitions for each child index in the DIT.

Figure 3:
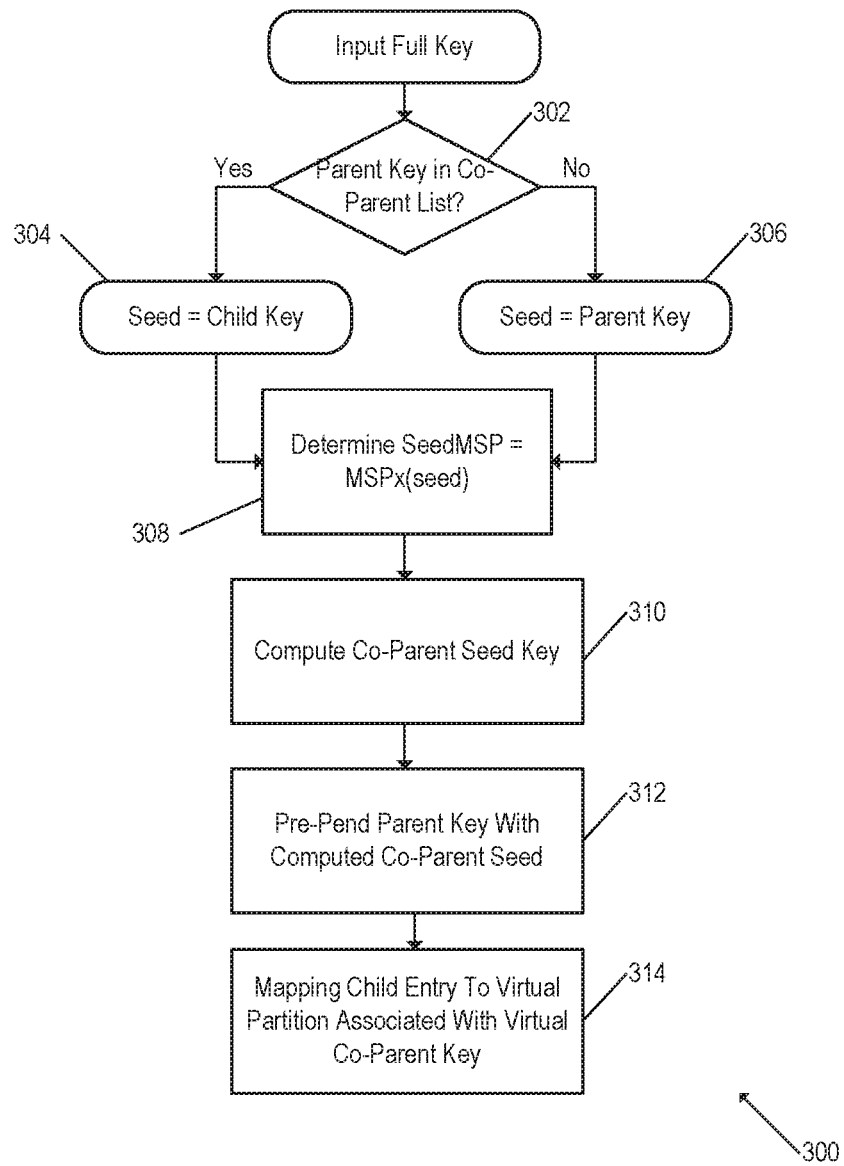
FIG. 3 is a flowchart illustrating a method for generating a virtual co-parent key.

FIG. 3 is a flowchart illustrating a method for generating a unique identification key including a virtual co-parent key. Although execution of method 300 is described below with reference to system 200, this is for explanatory purposes and other suitable components for execution of method 300 may be utilized. Additionally, the components for executing method 300 may spread among multiple devices. Method 300 may be implemented in the form of executable instructions stored on a machine-readable storage medium and/or in the form of electronic circuitry, e.g. hardware. In some examples, steps of method 300 may be executed substantially concurrently or in a different order than shown in FIG. 3. In some examples, method 300 may include more or less steps than are shown in FIG. 3. In some examples, some of the steps of method 300 may, at certain times, be ongoing and/or may repeat.

At block 302, it is determined if the input entry key is part of a co-parent list. For example, a key may be read and compared to a predetermined list. Where it is determined that the parent key is in the co-parent list, the seed of the child key is utilized 304. Conversely, where the parent key is not located in the co-parent list, the seed of the parent key 306 is utilized.

At block 308, a Most Significant Part (MSP) of the seed is determined, where the MSP is a truncated portion of the seed, specifically, the X leftmost bit values of the seed. The seed, in this example implementation, is the child key or the parent key of the input depending on the determination at block 302 above.

Once the MSP of the seed is determined, a virtual co-parent key of the input entry key may be computed at block 310. Specifically, the co-parent key may be computed from the equation, $$CP = Quotient(Seed\ MSP, bit\ mask/\#parts) * (bit\ mask/\#parts),$$

where CP is the computed co-parent key, Seed MSP is the value determined at block 308, and "bit mask" is a relevant bit mask applied corresponding to the size of the MSP. For example, Where the Seed MSP is the 16 leftmost bits values of the seed, the bitmask may be, when applying a bit shift, and specifically a leftward logical shift, 1<<16 (C or Java programming language notation)=65536 (decimal notation) =0X10000 (hexadecimal notation). At block 312, the co-parent key may be pre-pended to the parent key.

As an illustrative example, the co-parent key 240 of FIG. 2 may be calculated from method 300 described at FIG. 3. In this example, the full key of child index 226 may be inputted. At block 302, a lookup function may be implemented to determine whether the key is included in a stored co-parent list. For example, it may be determined that parent index 216, 0X8502, is not included in a stored co-parent list. Where, in this example implementation, it is determined that the parent index 216 is not included in the stored co-parent list, the parent key seed 306 may be implemented.

The Most Significant Part (MSP) of this seed, in this case parent key 0x8502, may be determined. For purposes of this example and clarity, the MSP may be the 16 leftmost bits values; however, the MSP may be determined having any number of leftmost bits values.

At block 310, the co-parent seed key may be computed, and may, as an illustrative example, be determined to be 0X8000=Quotient (0x0502,0x10000/2)*(0x10000/2), where 0x0502 is the seed MSP, 0X10000 is the bit mask, and 2 is the number of virtual partitions. At block 312, the resultant virtual co-parent key may be pre-pended to the parent key of child index 226, and, at block 314, the child entry may be mapped to the virtual partition associated with the virtual co-parent key.

In another example, the parent key may be determined to be included in the stored co-parent list. For example, the full key of child index 220 may be inputted, and it may be determined that parent index 214 is included in the stored co-parent list. In order to provide spreading of the keys in this instance, the co-parent key may be computed from child key 220 as illustrated at block 304. In this example, the MSP of key 0X8503 may be determined. At block 310, the co-parent seed key may be computed, and may, as an illustrative example, be determined to be 0X8000=Quotient (0X8503, 0X10000/2)*(0X10000/2), where 0X8503 is the seed MSP 2 is the number of virtual partitions, and 0X10000 is the bit mask. As described above, at block 312 the resultant virtual co-parent key may be pre-pended to the parent key of child index 226, and, at block 314, the child entry may be mapped to the virtual partition associated with the virtual co-parent key.

Referring to this mapping with respect to FIG. 2 as an example, partition A, which contains keys within the range of 0X0000 to 0XFFFF, now contains entries 220 and 224. Partition B, which contains keys within the range of 0X8000 to 0XFFFF, now contains entries 220, 224, 226, 228. When applying the co-parents algorithm and applying the pre-pended co-parent keys, example entries 220 and 224 are, unlike the example DIT illustrated in FIG. 1, mapped to partition B, and not to partition A. Accordingly, child entries may be reallocated through the introduction of a virtual co-parent key mapping. With a very large number of entries, this virtual co-parents mapping will facilitate spreading of keys among partitions, and reduce imbalanced partitions.

Figure 4:
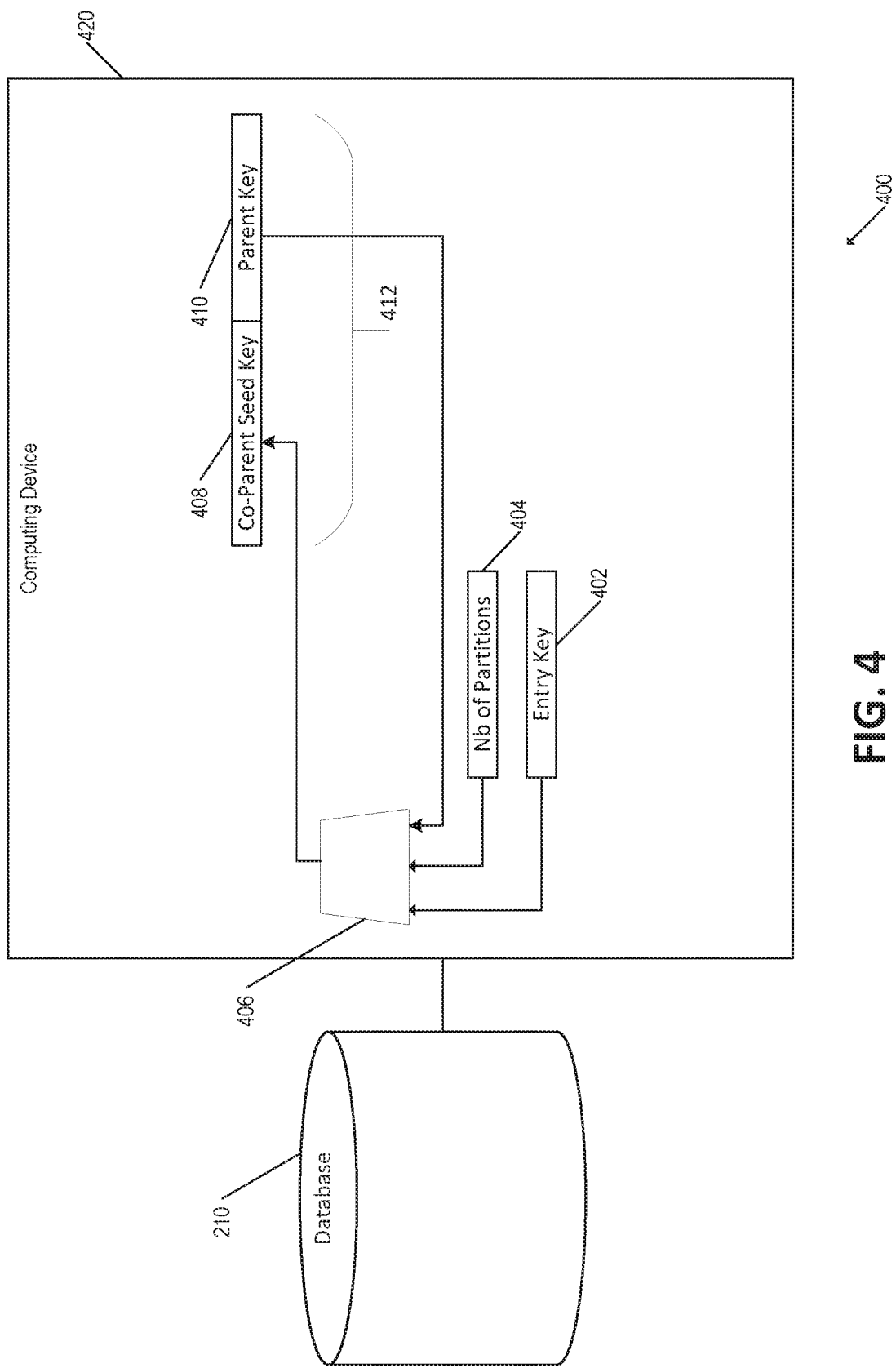
FIG. 4 is a block diagram illustrating a system for generating a virtual co-parent key.

FIG. 4 is a block diagram illustrating a system 400 for generating a virtual co-parent key 412. System 400 may include a storage system, e.g. database 210 of FIG. 2, which may store a document information tree (DIT) such as DIT 240 of FIG. 2. In an example implementation, database 210 may store a DIT having child indexes. The DIT may include at least one child index associated with a parent key and at least one child index associated with a virtual co-parent key, such as generated virtual co-parent key 412. In some example implementations, the parent key and the virtual co-parent key associated with respective child indexes of the DIT may be associated with different virtual partitions within database 210.

Each child index of the DIT may, for example, include a distinguished name and may be mapped to a location of a stored data entry. In some examples, the data entries may be stored locally at database 210. In some examples, the data entries may be stored remotely and may be accessible over a network. The data entries may also be spread across multiple databases, in any combination of local or remote storage. In yet other example implementations, data entries mapped to child indexes associated with a like parent index may share a database, location, physical and/or virtual region, data center, etc. In some examples, data entries mapped to child indexes having like parent keys, or like virtual co-parent keys, may be stored at a like database, location, physical and/or virtual region, data center, etc.

Database 210 may be in communication with computing device 420. Computing device 420 may, in some examples, generate virtual co-parent key 412, and may associate a child index with the generated virtual co-parent key. Computing device 420 is illustrated with example logic to generate virtual co-parent key 412. The logic illustrated at computing device 420 may be any combination of hardware and/or firmware for generating virtual co-parent key 412 and, in some examples, may take the form of instructions in memory to be executed by a processor. In some examples, the logic included at computing device 420 may be implemented as dedicated electronic circuitry including a field-programmable gate array and/or any number of application-specific integrated circuits (ASICs) within computing device 420.

The logic illustrated at computing device 420 may generate virtual co-parent key 412. In the illustrated example, an entry key 402 may be received as input, e.g. from the DIT stored at database 210. Entry key 402 may, in some examples, be utilized to calculate a co-parent seed key, e.g. co-parent seed key 408. Specifically, co-parent seed key 408 may be computed from entry key 402, and a number of partitions 404 included in the document information tree stored at database 210. For example, the number of partitions is 2. Entry key 402 may, for example, be the distinguished name (DN) of a child entry with which generated virtual co-parent key 412 is to be associated. In some example implementations, entry key 402 may include the child key with which generated virtual co-parent key 412 is to be associated, as well as the parent key 410 associated with the child index.

In an example, the co-parent key may be generated according to the method described at FIG. 3. For example, it may be determined if the input entry key is part of a co-parent list. A seed may be extracted from the entry key, i.e. a child key or parent key of the child index with which generated virtual co-parent key 412 is to be associated. An MSP of a seed may be determined, the seed being either the child key or the parent key depending on whether the input entry key is or is not part of the co-parent list. Once the MSP of the seed is determined, a co-parent seed key may be computed, e.g., from the equation, CP=Quotient(Seed MSP, bit mask/#of part)*(bit mask/#part) #of part), thus creating a virtual and globally unique co-parent key. Computed co-parent seed key 408 may be pre-pended to the parent key 410 associated with the child index and the child index may thereafter be associated with the virtual co-parent key.

Figure 5:
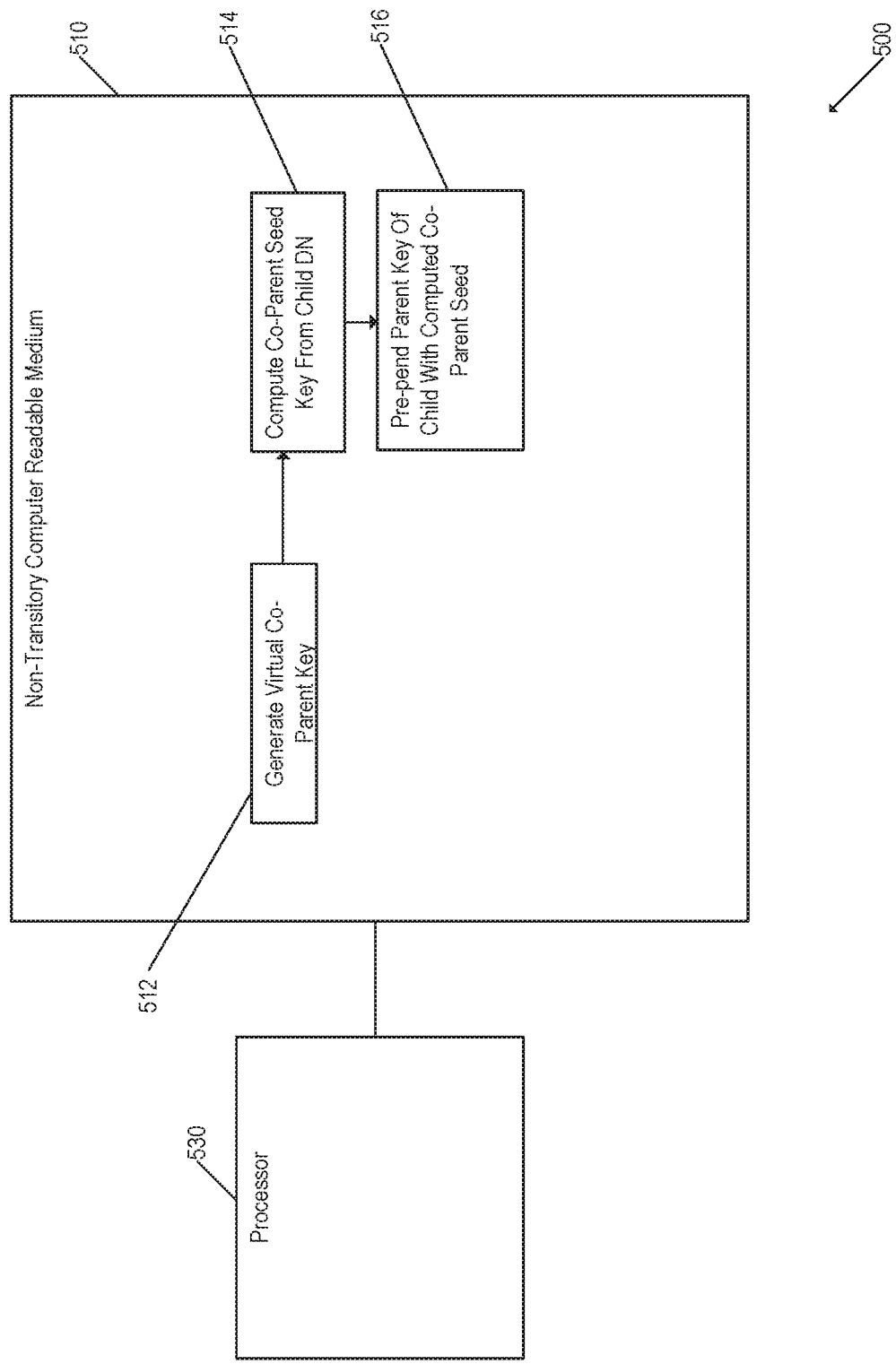
FIG. 5 is a block diagram of an example non-transitory machine-readable medium storing instructions for generating a virtual co-parent key.
Figure 6:
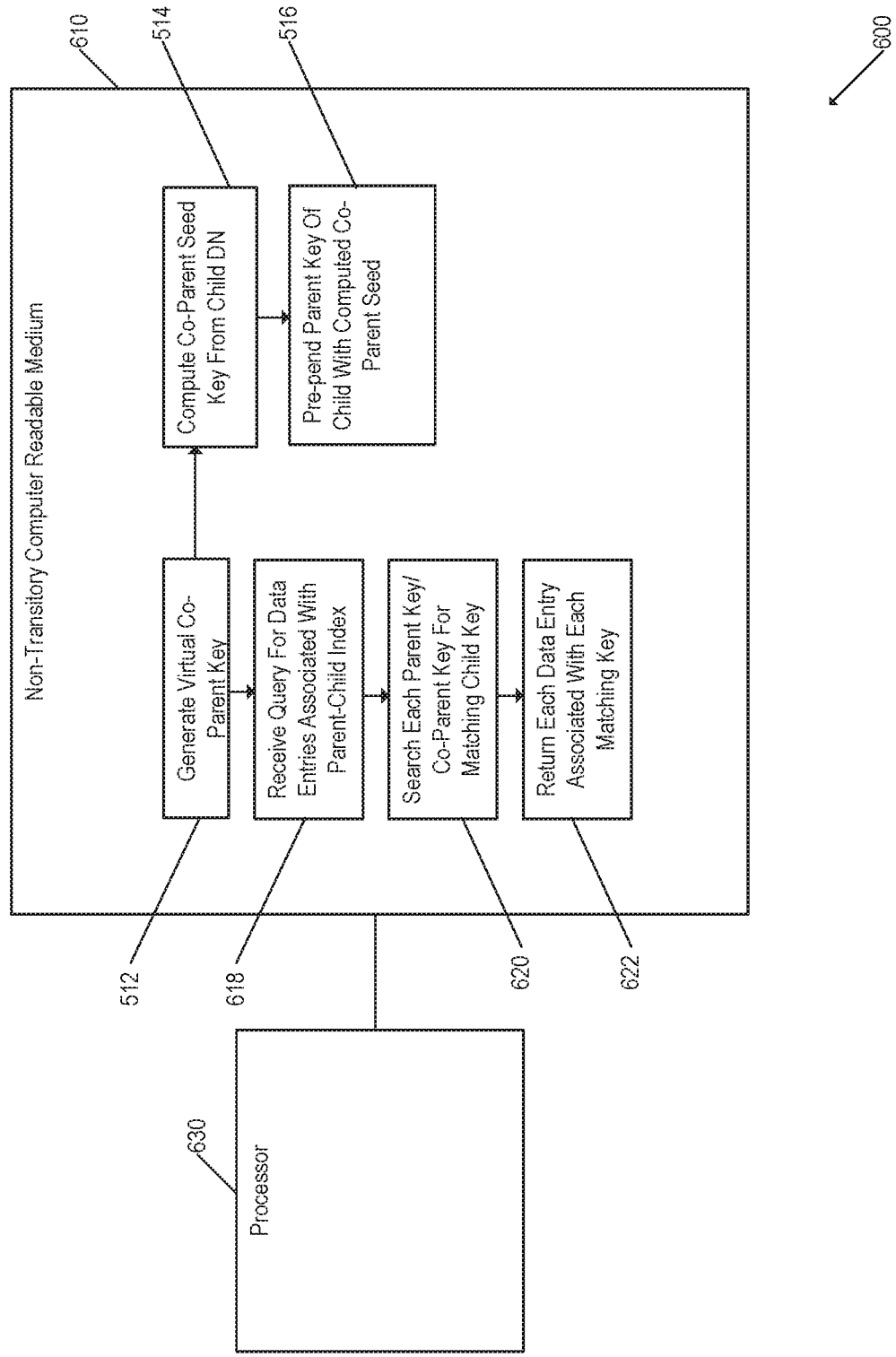
FIG. 6 is a block diagram of another example non-transitory machine-readable medium storing instructions for generating a virtual co-parent key.

FIG. 5 and FIG. 6 are block diagrams, 500 and 600 respectively, of example non-transitory machine-readable mediums for generating a virtual co-parent key. Non-transitory machine-readable storage medium 510 of FIG. 5 may be coupled to a processor, e.g. processor 530, and non-transitory machine-readable storage medium 610 of FIG. 6 may be coupled to a processor, e.g. processor 630, for generating virtual co-parent keys. Non-transitory machine-readable storage medium 510 and non-transitory machine-readable storage medium 610 may include executable instructions thereon.

Non-transitory machine-readable storage medium 510 (or non-transitory machine-readable storage medium 610) may be implemented in a single device or distributed across devices. Likewise, processor 530 (or processor 630) may represent any number of physical processors capable of executing instructions stored by non-transitory machine-readable storage medium 510 (or non-transitory machine-readable storage medium 610). Further, non-transitory machine-readable storage medium 510 (or non-transitory machine-readable storage medium 610) may be fully or partially integrated in the same device as processor 530 (or processor 630), or it may be separate but accessible to that device.

In one example, the instructions may be part of an installation package that when installed can be executed by processor 510 (or processor 610) to generate virtual co-parent keys. In this case, non-transitory machine-readable storage medium 510 (or non-transitory machine-readable storage medium 610) may be a portable medium such as a floppy disk, CD, DVD, or flash drive or a memory maintained by a server from which the installation package can be downloaded and installed. In another example, the program instructions may be part of an application or applications already installed. Here, non-transitory machine-readable storage medium 510 (or non-transitory machine-readable storage medium 610) may include a hard disk, optical disk, tapes, solid state drives, RAM, ROM, EEPROM, or the like.

Processor 530 or 630 may be a central processing unit (CPU), graphics processing unit (GPU), microprocessor, and/or other hardware device suitable for retrieval and execution of instructions stored in non-transitory machine-readable storage medium 510 (or non-transitory computer readable storage medium 610). Processor 530 may fetch, decode, and execute program instructions 512-516, and/or other instructions. Similarly, processor 630 may fetch, decode, and execute program instructions 612-622. As an alternative or in addition to retrieving and executing instructions, processor 530 may include at least one electronic circuit comprising a number of electronic components for performing the functionality of instructions 512-516, and/or other instructions. Similarly, processor 630 may include at least one electronic circuit comprising a number of electronic components for performing the functionality of instructions 612-622, and/or other instructions.

Turning to FIG. 5, non-transitory machine-readable medium 510 may include instructions 512, that, when executed, may cause processor 530 to generate a virtual co-parent seed key, e.g. virtual co-parent key 412 of FIG. 4. In an example, non-transitory machine-readable medium 510 may include instructions 514, that, when executed, may cause processor 530 to compute a virtual co-parent seed key according to the method described above with respect to FIG. 3 and/or according to the logic included at computing device 420 as described above with respect to FIG. 4. For example, a co-parent seed key may be calculated from an entry key and a number of partitions included in the document information tree. The entry key may, in an example, be a distinguished name (DN) of the child index with which the generated virtual co-parent key is to be associated.

It may be determined if the input entry key is part of a co-parent list and a seed may be extracted from the entry key, i.e. a child key or parent key of the child index with which the generated virtual co-parent key is to be associated. An MSP of a seed may be determined, the seed being either the child key or the parent key depending on whether the parent key is or is not part of the co-parent list.

Once the MSP of the seed is determined, a co-parent seed may be computed from equation, CP=Quotient(Seed MSB, bit mask/#of part)*(bit mask/#of part) as described above. Non-transitory machine-readable medium 510 may further include instructions 516, that, when executed, may cause processor 530 to pre-pend the parent key associated with the child index with the computed co-parent seed. The child index may thereafter be associated with the virtual co-parent key. In some examples, the generated virtual co-parent key may be referenced for any future lookups associated with the virtual co-parent key and not the parent key from which the virtual co-parent key was generated.

Turning to FIG. 6, non-transitory computer readable medium 610 may include similar architecture to example non-transitory computer readable medium 510 of FIG. 5, including blocks 512-516. Blocks 512-516, as detailed above, illustrate logic to be executed by a processor, e.g., processor 630.

As described above, instructions 512, when executed, may cause a processor, e.g. processor 630, to generate a virtual co-parent seed key. Instructions 514, when executed, may compute a virtual co-parent seed key according to the method described above with respect to FIG. 3 and/or according to the logic included at computing device 420 as described above with respect to FIG. 4. Non-transitory machine-readable medium 610 may further include instructions 516 that pre-pend a parent key associated with the child index with the computed co-parent seed. The child index may thereafter be associated with the virtual co-parent key.

Non-transitory computer readable medium 610 may further include instructions to conduct a data entry lookup utilizing a document information tree having at least one virtual co-parent key. Non-transitory computer readable medium 610 may for example, include instructions 618 that, when executed by processor 630, receives a query for a data entry associated with the document information tree. In some example implementations, a data entry may be associated with a document information where a child index of the document information tree maps to a storage location of the data entry.

Non-transitory computer readable medium 610 may for example, include instructions 620 that, responsive to receiving a query for a data entry read/write, searches within each matching parent key or co-parent key of the document information tree for a child key matching the query, i.e., a child key mapped to a location of the target data entry.

In a document information tree having no virtual co-parent keys, a search may be performed by searching for a matching parent key of a parent index, and each child index associated with a matching parent key. By contrast, a document information tree having a virtual co-parent key is searched by searching for a possible matching parent key or co-parent key within each virtual partition of the document information tree. Where a number of parent keys and/or co-parent keys is small relative to a number of child keys of a document information tree, the additional searching conducted at the parent key level is minimal as compared to the additional searching of child indexes that would be conducted absent incorporated co-parent keys.

Non-transitory computer readable medium 610 may for example, include instructions 622 that, when executed by processor 630, may return each data entry associated with each matching key. In an example implementation, the data entries returned may span across multiple virtual partitions. For example, child indexes associated with co-parent keys of different virtual partitions may each map to a respective returned data entry. Depending on the nature of the received query at block 618, the return may result in a read and/or write of the returned data entry. Accordingly, a document information tree having virtual co-parent keys for balancing of child indexes enables efficient searching of the document information tree for associated data entries.

Figure 7:
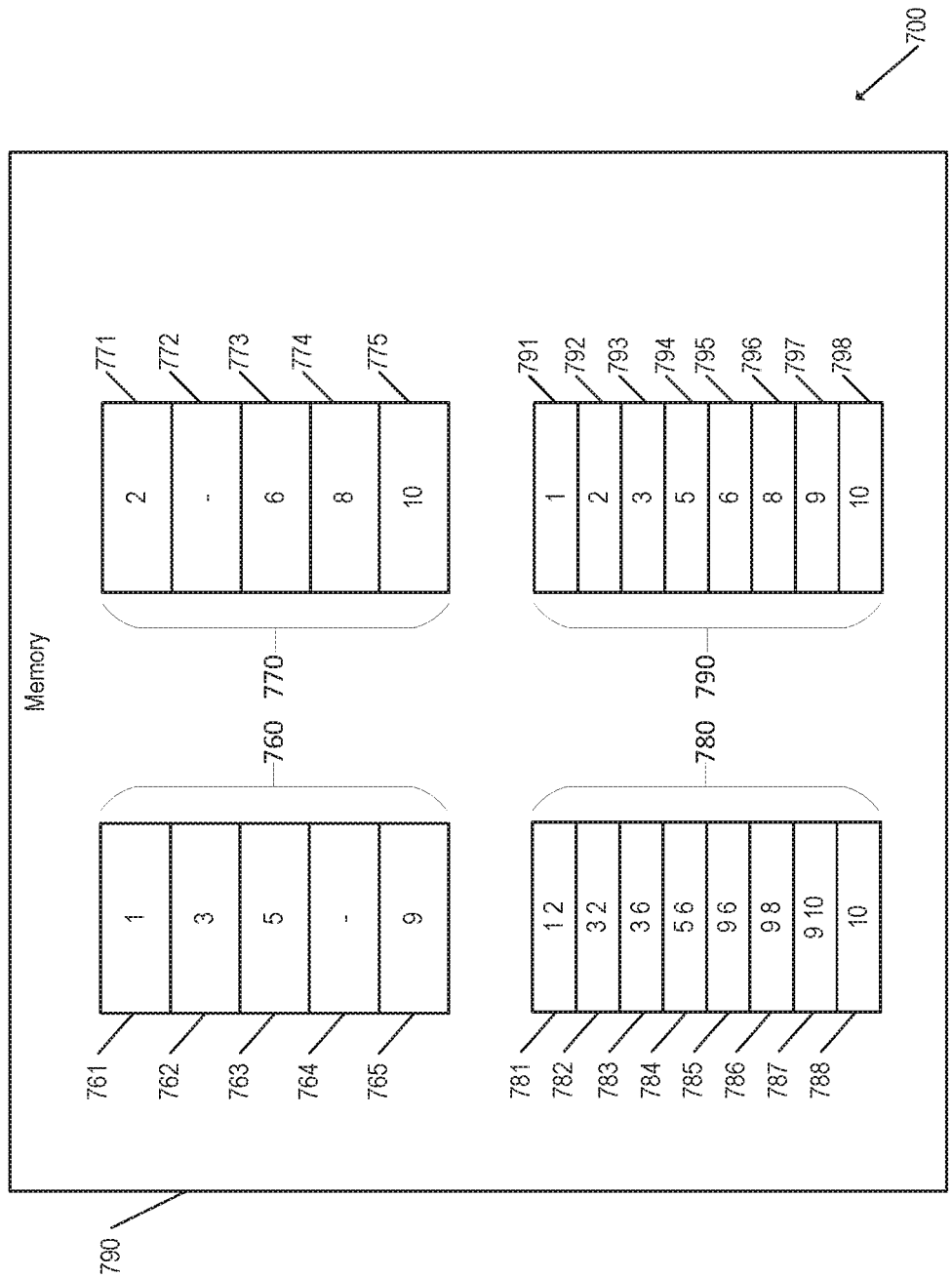
FIG. 7 is a block diagram illustrating a scheme for properly ordering results indexed according to a DIT balanced by a virtual co-parent key.

Absent a proper ordering scheme, the order of data entries returned at block 622 may be inconsistent with the order of data entries returned by a like document information tree not having virtual co-parent keys. FIG. 7 is a block diagram 700 illustrating a scheme for properly ordering results returned from a document information tree having at least one virtual co-parent key (not shown).

Illustrated at block diagram 700 is a returned data entry slice 760, of a first partition, and a returned data entry slice 770 of a second partition. In this illustrated example, data entry slice 760 may include data entries 761-765 respectively, ordered within data entry slice 760, and data entry slice 770 may include data entries 771-775 respectively, ordered within data entry slice 770. Data slices 760 and 770 may be stored in example memory 790. For purposes of simplicity and conciseness, only a most significant part (MSP) is illustrated at each data entry, however, in other example implementations, a full distinguished name of a data entry and/or a full child key may be stored for purposes of ordering.

In some example implementations, an entry of a first data slice with a smallest initial key of the first data slice may be returned, and may be compared to an entry of a second data slice with a smallest initial key of the second data slice. For example, data entry 761 of data slice 760 and data entry 771 of data slice 770 may be returned and may be compared, e.g. at block 781. The data entry having the smaller value may be returned, e.g. at block 791.

The data entry having the larger value at the comparison at block 781, may be compared to a next highest value of a data slice 762, e.g. at block 782. The smallest of the two values may be once again returned, e.g. at block 792. This process may repeat until each value is compared, e.g. at blocks 783-788 respectively, and each value is returned in ordered fashion, e.g. at blocks 793-798 respectively. The ordered data entries may then be returned responsive to the data entry query request.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A method of sorting document information in an indexed database comprising:
generating, by a processor, a parent key identifying each parent index of a plurality of parent indices in a memory, wherein each parent index comprises a number of child indices in the memory;
generating, by the processor, a child key identifying each child index in the memory, wherein each child index depends from a respective parent index;
generating, by the processor, a plurality of virtual co-parent keys, each virtual co-parent key creating a virtual partition between each parent index of the plurality of parent indices, wherein each respective virtual partition is configured to logically group a respective first parent index comprising a respective first number of child indices with a respective second parent index comprising a respective second number of child indices, and wherein generating the plurality of virtual co-parent keys includes:
extracting a seed from either the parent key or the child key, wherein the seed comprises a portion of the parent key or a portion of the child key*;
computing a co-parent seed key from the extracted seed, wherein the co-parent seed key is computed by determining a quotient of a most significant part of either the parent key or child key, one or more bit mask and a number of parts; and
pre-pending the co-parent seed key to either the parent key or child key; and
mapping, by the processor, a virtual co-parent key to a child index when the seed is extracted from the child key.

2. The method of claim 1, further comprising mapping the virtual co-parent key to the virtual partition.

3. The method of claim 1, wherein computing the virtual co-parent seed key further comprises:
Determining, by the processor, whether the parent key is in a predetermined co-parent list; and
computing, by the processor, the virtual co-parent seed key from the child key of the child index when the parent key is in the predetermined co-parent list.

4. The method of claim 3, wherein the virtual co-parent seed key (CSK) is computed from an equation:

$$CSK = \text{Quotient}\left(MSP \text{ of Child Key}, \frac{\text{bit mask}}{\text{Number of Partitions}}\right) * \left(\frac{\text{bit mask}}{\text{Number of Partitions}}\right).$$

wherein MSP is the Most Significant Part of the child key, and "bit mask" is a relevant applied mask corresponding to a size of the MSP.

5. The method of claim 1, wherein computing the virtual co-parent seed further comprises:
Determining, by the processor, whether the parent key is in a predetermined co-parent list; and
computing the virtual co-parent seed key from the parent key of the child index when the parent key is not in the predetermined co-parent list.

6. The method of claim 5, wherein computing the virtual co-parent seed key (CSK) is computed from an equation:

$$CSK = \text{Quotient}\left(MSP \text{ of Parent Key}, \frac{\text{bit mask}}{\text{Number of Partitions}}\right) * \left(\frac{\text{bit mask}}{\text{Number of Partitions}}\right),$$

and wherein MSP is a Most Significant Part of the parent key, and "bit mask" is a relevant applied mask corresponding to a size of the MSP.

7. A non-transitory computer-readable data storage medium storing program code executable by a processor to:
Generate, at the processor, a virtual co-parent key for a child index within a document information tree, the child index having a distinguished name including a child key and parent key associated with a parent index of the document information tree, wherein each child index includes a child key, wherein each virtual co-parent key is configured to create a virtual partition, and wherein generating the virtual co-parent key includes:
extracting a seed from the child key, wherein the seed comprises a portion of the child key;
determining a most significant part (MSP) of the seed, wherein the most significant part of the seed is a leftmost bit value of the seed;
computing a co-parent seed key based in-part on the distinguished name of the child index and the MSP of the seed; and
pre-pending the virtual co-parent key of the child index with a co-parent seed.

8. The non-transitory computer-readable data storage medium of claim 7, wherein computing the virtual co-parent seed key from the distinguished name includes computing the virtual co-parent seed key from either the child key or the parent key of the child index.

9. The non-transitory computer-readable data storage medium of claim 7, wherein the virtual co-parent seed key is computed from the parent key of the child index, and the generated virtual co-parent key is associated with a different virtual partition than the parent key from which the co-parent seed key was computed.

10. The non-transitory computer-readable data storage medium of claim 7, wherein the program code is executed by the processor to further:
   receive a query for any number of data entries associated with the document information tree;
   search within each matching parent key or co-parent key of the document information tree for a child key matching the query; and
   return each data entry associated with each matching child key.

11. The non-transitory computer-readable data storage medium of claim 10, wherein the program code is executed by the processor to further sort each returned data entry by:
   identifying each parent key and co-parent key having at least one matching child key associated with the parent key or co-parent key; and
   sorting the child keys associated with each identified parent key and co-parent key.

12. The non-transitory computer-readable data storage medium of claim 7, wherein a first child entry mapped to a first child index associated with a first parent index are stored in a first physical region.

13. They non-transitory computer-readable storage medium of claim 7, wherein data entries mapped to child indexes having a same co-parent seed key are stored in a same virtual region.

14. The non-transitory computer-readable storage medium of claim 7, wherein the virtual co-parent seed key (CSK) is computed from the child key of the child index using an equation:

$$CSK = \text{Quotient}\left(MSP \text{ of Child Key}, \frac{\text{bit mask}}{\text{Number of Partitions}}\right) * \left(\frac{\text{bit mask}}{\text{Number of Partitions}}\right),$$

wherein MSP is a Most Significant Part of the child key, and "bit mask" is a relevant applied mask corresponding to a size of the MSP.

15. The non-transitory computer-readable storage medium of claim 7, wherein the virtual co-parent seed key (CSK) is computed from the parent key of the child index using an equation, $$CSK = \text{Quotient}\left(MSP \text{ of Parent Key}, \frac{\text{bit mask}}{\text{Number of Partitions}}\right) * \left(\frac{\text{bit mask}}{\text{Number of Partitions}}\right)$$

and wherein MSP is a Most Significant Part of the parent key, and "bit mask" is a relevant applied mask corresponding to a size of the MSP.

16. A system comprising:
   a storage system storing a document information tree having a first child index associated with a parent key and a second child index associated with a virtual co-parent key, wherein each child index includes a distinguished name and is mapped to a location of a stored data entry; and
   a computing device in communication with the storage system, wherein the computing device is configured to generate the virtual co-parent key in the document information tree from a distinguished name of the second child index, and associate the second child index with the generated virtual co-parent key, wherein the parent key and the co-parent key are associated with different virtual partitions within the storage system, and wherein generating the virtual co-parent key includes:
      extracting a seed from a child key, wherein the seed includes a portion of a child key;
      determining a most significant part of the seed, wherein a most significant part of the seed is a leftmost bit value of the seed;
      computing, at a processor, a virtual co-parent seed key from the distinguished name of the second child index, and the most significant part of the seed; and
      pre-pending the virtual co-parent key associated with the second child index with the computed co-parent seed key.

17. The system of claim 16, wherein the computing device computes the co-parent seed key from either the child key or the parent key of the child index.

18. The system of claim 16, wherein data entries mapped to child indexes associated with a same parent index are stored in a same physical region.

19. They system of claim 16, wherein data entries mapped to child indexes having a same co-parent seed key are stored in a same virtual region.

* * * * *